US012735529B2

(12) United States Patent
Sasaki et al.

(10) Patent No.: US 12,735,529 B2
(45) Date of Patent: Sep. 15, 2026

(54) POLYESTER RESIN

(71) Applicant: TOYOBO MC Corporation, Osaka (JP)

(72) Inventors: Hironao Sasaki, Osaka (JP); Keiichiro Togawa, Shiga (JP); Hiroaki Fukushima, Fukui (JP)

(73) Assignee: TOYOBO MC CORPORATION, Osaka (JP)

( * ) Notice: Subject to any disclaimer, the term of this patent is extended or adjusted under 35 U.S.C. 154(b) by 538 days.

(21) Appl. No.: 18/266,894

(22) PCT Filed: Dec. 13, 2021

(86) PCT No.: PCT/JP2021/045856
§ 371 (c)(1),
(2) Date: Jun. 13, 2023

(87) PCT Pub. No.: WO2022/131218
PCT Pub. Date: Jun. 23, 2022

(65) Prior Publication Data

US 2024/0117107 A1 Apr. 11, 2024

(30) Foreign Application Priority Data

Dec. 15, 2020 (JP) ................................ 2020-207927

(51) Int. Cl.
*C08G 63/183* (2006.01)

(52) U.S. Cl.
CPC ................................ *C08G 63/183* (2013.01)

(58) Field of Classification Search
None
See application file for complete search history.

(56) References Cited

U.S. PATENT DOCUMENTS 5,523,135 A 6/1996 Shiwaku et al.
2012/0184678 A1* 7/2012 Deeter ..................... C08F 2/38 525/176
2013/0115402 A1* 5/2013 Tammaji ................ C08G 63/80 523/400
2025/0122344 A1* 4/2025 Sasaki .................. C08G 63/183

FOREIGN PATENT DOCUMENTS

JP 05-112701 5/1993
JP 2003-064244 3/2003
JP 2013-500355 1/2013
JP 2013-530300 7/2013
JP 2016/56384 4/2016
JP 5931061 6/2016
JP 5941843 6/2016
WO 2021/129393 7/2021
WO 2022/131218 6/2022
WO 2022/131219 6/2022
WO 2022/131220 6/2022

OTHER PUBLICATIONS

International Search Report issued Feb. 22, 2023 in International (PCT) Application No. PCT/JP2021/045856.
Extended European Search Report issued Nov. 13, 2024 in corresponding European Patent Application No. 21906580.2.
International Search Report issued Nov. 29, 2022 in International (PCT) Application No. PCT/JP2022/035458.
Examination Report issued Dec. 1, 2025 in Indian Patent Application No. 202447028111.

* cited by examiner

*Primary Examiner* — Terressa Boykin
(74) *Attorney, Agent, or Firm* — Wenderoth, Lind & Ponack, L.L.P.

(57) ABSTRACT

An object of the present invention is to provide a polyester resin excellent in moldability, surface smoothness, transparency, mechanical characteristics, and heat-resistance, with reduced generation of gel. The present invention relates to a polyester resin comprising a constituent moiety derived from dicarboxylic acid component and a constituent moiety derived from alcohol component, wherein a content of a compound represented by Formula (I) is 0.0002 to 5.9% by weight in 100% by weight of the alcohol component. In the Formula (I), m and n each represent 1 to 1000, 1 represents 0 to 1000, $R^1$ represents an aromatic hydrocarbon group having 6 to 20 carbon atoms, and $R^2$, $R^3$, and $R^4$ each represent a hydrogen atom or an alkyl group having 1 to 10 carbon atoms.

(I)

12 Claims, No Drawings

POLYESTER RESIN

TECHNICAL FIELD

The present invention relates to a polyester resin for forming a molded article excellent in moldability, transparency, mechanical characteristics, and heat-resistance. Specifically, the present invention relates to a polyester resin which enables improvement in moldability in molding requiring high melt tension, such as extrusion molding, profile extrusion molding, direct blow molding, inflation molding, injection blow molding, and calendar processing molding, and also improvement in transparency, mechanical characteristics, and heat resistance.

BACKGROUND ART

In recent years, the vinyl chloride-based resin has been replaced with other materials due to its effects on the environment. Among many alternatives, the polyester resin has been considered as a promising candidate material because of its physical properties, suitability to environment, adhesive properties, price and the like.

Among the polyester resins, for example, crystalline polyester resins such as polyethylene terephthalate (PET), polybutylene terephthalate (PBT), and polyethylene naphthalate (PEN) have been used for the manufacture of various products by melt molding, such as heat resistant parts by injection molding, films and sheets by extrusion molding, beverage bottles by blow molding, and fibers by melt spinning.

However, improvement in transparency and flexibility of molded articles formed from such crystalline polyester resins has required various techniques in controlling of cooling conditions during processing and also treatments in stretching processes.

In addition, crystalline polyester resins were the cause of remarkable phenomenon known as drawdown in the processes of profile extrusion molding, direct blow molding, and inflation molding, which required high melt tension of resin. The drawdown phenomenon caused sagging of preform and molded article and thus an increase in nonuniformity of wall thickness and burr of the molded article, thereby decreasing the production rate of quality products and stability in continuous production.

Patent Documents 1 to 3 disclose inventions involving introduction of a branched structure (a branching agent) in resin skeletons in order to solve the drawdown phenomenon, enabling the moldability to be improved in direct blow molding which requires high melt tension.

PRIOR ART DOCUMENT

Patent Document

Patent Document 1: JP-B2-6931061
Patent Document 2: JP-B2-5941848
Patent Document 3: JP-A-2016-56384

SUMMARY OF THE INVENTION

Problems to be Solved by the Invention

However, in Patent Documents 1 to 3, gelled material was generated due to high reactivity between branched structures (branching agent) when the branching agent was mixed with carboxylic acid compounds to react with constituent component of polyester resins. The generation of gel led to a decrease in solubility of the branching agent in constituent components of the polyester resins, resulting in a problem that thus obtained molded article of the polyester resin failed to have high surface smoothness.

Although the drawdown was improved in Patent Documents 1 to 3, too high melt tension caused melt fracture of the polyester resin discharged from a die for molding and thus decreased surface smoothness of the molded article, resulting in a reduction in transparency of it. In addition, the molded article of the polyester resins is required to have heat resistance.

Further, cyclic oligomers (including tetramer) were generated in the production process of the polyester resins and contaminated molds during processing, leading to a decrease in moldability in continuous molding.

The present invention has been made to solve such problems of the conventional art, and an object of the present invention is to provide a polyester resin for forming a molded article excellent in moldability, surface smoothness, transparency, mechanical characteristics, and heat resistance, with reduced generation of gel. In addition, as a preferred problem of the present invention, the present invention also aims to provide a polyester resin which contains low content of cyclic oligomers and brings a molded article having high moldability in continuous molding.

Specifically, an object of the present invention is to provide a polyester resin for forming a molded article excellent in surface smoothness, transparency, mechanical characteristics, and heat-resistance, with reduced generation of gel, and also moldability in extrusion molding, profile extrusion molding, direct blow molding, inflation molding, injection blow molding, and calendar processing molding, which requires high melt tension.

Solution to the Problems

As a result of earnest studies, the present inventors have found that the problems can be solved by the following means, and have arrived at the present invention. The present invention has the following features.

[1] A polyester resin comprising a constituent moiety derived from dicarboxylic acid component and a constituent moiety derived from alcohol component, wherein a content of a compound represented by Formula (I) is 0.0002 to 5.9% by weight in 100% by weight of the alcohol component:

[Chemical Formula 1]

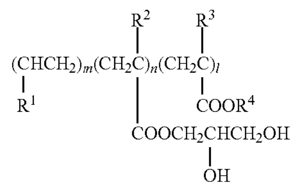

(I)

in the formula, m and n each represent 1 to 1000, 1 represents 0 to 1000, $R^1$ represents an aromatic hydrocarbon group having 6 to 20 carbon atoms, and $R^2$, $R^3$, and $R^4$ each represent a hydrogen atom or an alkyl group having 1 to 10 carbon atoms.

[2] The polyester resin according to [1], wherein the compound represented by Formula (I) has weight average molecular weight of 200 or more and 500000 or less.

[3] The polyester resin according to [1] or [2], wherein the dicarboxylic acid component comprises 85 to 100 mol % of terephthalic acid in 100 mol % of the dicarboxylic acid component and the alcohol component comprises ethylene glycol.

[4] The polyester resin according to any one of [1] to [3], wherein a content of cyclic tetramer in the polyester resin is less than 2680 ppm.

[5] The polyester resin according to any one of [1] to [4], wherein the polyester resin has melt tension of 15 mN or more as measured under conditions of a temperature of 270° C., a taking up speed of 100 m/min, and a shear rate of 243 $s^{-1}$.

[6] The polyester resin according to any one of [1] to [5], wherein the polyester resin has melt viscosity of 26000 dPa·s or more as measured under conditions of a temperature of 270° C. and a shear rate of 30 $s^{-1}$ and 6500 dPa·s or less as measured under conditions of a temperature of 270° C. and a shear rate of 2000 $s^{-1}$.

Effects of the Invention

According to the present invention, a molded article of the polyester resin is excellent in moldability, surface smoothness, transparency, mechanical characteristics, and heat-resistance, with reduced generation of gel.

In particular, the moldability of the polyester resin is excellent in extrusion molding, profile extrusion molding, direct blow molding, inflation molding, injection blow molding, and calendar processing molding, which need high melt tension, compared to conventional polyester resins.

As preferred effects of the present invention, a polyester resin which contains low content of cyclic oligomers and brings a molded article with high moldability in continuous molding can be obtained.

MODE FOR CARRYING OUT THE INVENTION

1. Polyester Resin

The polyester resin of the present invention comprises a constituent moiety derived from dicarboxylic acid component and a constituent moiety derived from alcohol component (preferably polyol component), and a content of a compound represented by Formula (I) is 0.0002 to 5.9% by weight in 100% by weight of the alcohol component. Unlike conventional branching agents, the compound represented by Formula (I) has a modified glycidyl group (epoxy group), therefore, the compound can react with constituent component of the polyester resin without any side reactions, such as formation of gelled material from compounds represented by Formula (I).

[Chemical Formula 2]

(I)

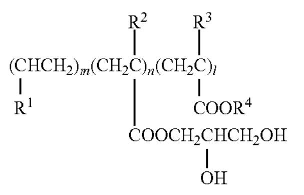

In the formula, m and n each represent 1 to 1000, 1 represents 0 to 1000, $R^1$ represents an aromatic hydrocarbon group having 6 to 20 carbon atoms, and $R^2$, $R^3$, and $R^4$ each represent a hydrogen atom or an alkyl group having 1 to 10 carbon atoms.

The polyester resin of the present invention comprises a polymer of predetermined dicarboxylic acid component and alcohol component, and predetermined amount of a compound represented by Formula (I) as an alcohol component.

In the present invention, the compound represented by Formula (I) is a branching agent to the polyester resin and used as an alcohol component together with diol component (hereinafter, referred to as merely 'diol component'), which is normally used for synthesis of polyester. The compound represented by Formula (I) may exist as the compound in the resin composition as far as the compound is bound in the polyester resin chain at an appropriate stage. Preferably, the compound represented by Formula (I) is bound with carboxylic acid component in the polyester resin.

The compound represented by Formula (I) has, on average, two or more (preferably 3 or more) functional groups (hydroxyl groups) per molecule. The functional groups can react with carboxyl groups of the dicarboxylic acid component, allowing partial introduction of the branched structure throughout the chain of the polyester resin.

Thus, the polyester resin of the present invention containing the compound represented by the Formula (I) can reduce gelation, and also, can prevent melt fracture during molding by lowering melt tension which increases with an increase in temperature during melt extrusion and by decreasing melt viscosity at high shear rate; therefore, moldability, surface smoothness, transparency, mechanical properties, and heat resistance of the molded article can be improved.

Further, the polyester resin contains low content of cyclic oligomer and thus fouling of a mold is reduced in processing, thereby enabling improvement in continuous moldability.

The compound represented by Formula (I) is as follows.

[Chemical Formula 3]

(I)

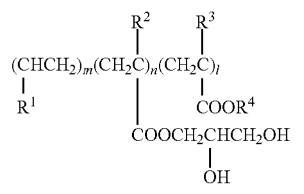

In the formula, m and n each represent 1 to 1000, 1 represents 0 to 1000, $R^1$ represents an aromatic hydrocarbon group having 6 to 20 carbon atoms, and $R^2$, $R^3$, and $R^4$ each represent a hydrogen atom or an alkyl group having 1 to 10 carbon atoms.

$R^1$ represents an aromatic hydrocarbon group having 6 to 20 carbon atoms.

Examples of the aromatic hydrocarbon groups having 6 to 20 carbon atoms represented by $R^1$ include phenyl group, o-tolyl group, m-tolyl group, p-tolyl group, 2-ethylphenyl group, 3-ethylphenyl group, 4-ethylphenyl group, 2,3-dimethylphenyl group, 2,4-dimethylphenyl group, 2,5-dimethylphenyl group, 2,6-dimethylphenyl group, 3,4-dimethylphenyl group, 3,5-dimethylphenyl group, 4-vinylphenyl group, o-isopropylphenyl group, m-isopropylphenyl group, p-isopropylphenyl group, o-tert-butylphenyl group, m-tert-butylphenyl group, p-tert-butylphenyl group, 3,5-di-(tert-butyl)phenyl group, 3,5-di-(tert-butyl)-4-methylphenyl group, 4-butylphenyl group, 4-pentylphenyl group, 2,6-bis(1-methylethyl)phenyl group, 2,4,6-tris(1-methylethyl)phenyl group, 4-cyclohexylphenyl group, 2,4,6-trimethylphenyl group, 4-octylphenyl group, 4-(1,1,3,3-tetramethylbutyl)phenyl group, 1-naphthyl group, 2-naphthyl group, 5,6,7,8-tetrahydro-1-naphthyl group, 5,6,7,8-tetrahydro-2-naphthyl group, and fluorenyl group.

The aromatic hydrocarbon group has the carbon atoms of preferably 6 to 18, more preferably 6 to 15, and further preferably 6 to 12.

Among them, the aromatic hydrocarbon group is particularly preferably phenyl group, o-tolyl group, m-tolyl group, or p-tolyl group, and most preferably phenyl group.

$R^2$, $R^3$, and $R^4$ each represent a hydrogen atom or an alkyl group having 1 to 10 carbon atoms.

Examples of the alkyl groups having 1 to 10 carbon atoms represented by $R^2$, $R^3$, and $R^4$ include linear alkyl groups such as methyl group, ethyl group, propyl group, butyl group, pentyl group, hexyl group, heptyl group, octyl group, nonyl group, and decyl group;

branched chain alkyl groups such as isopropyl group, isobutyl group, sec-butyl group, tert-butyl group, 2-ethylbutyl group, 3,3-dimethylbutyl group, 1,1,3,3-tetramethylbutyl group, 1-methylbutyl group, 1-ethylpropyl group, 3-methylbutyl group, neopentyl group, 1,1-dimethylpropyl group, 2-methylpentyl group, 3-ethylpentyl group, 1,3-dimethylbutyl group, 2-propylpentyl group, 1-ethyl-1,2-dimethylpropyl group, 1-methylpentyl group, 4-methylpentyl group, 4-methylhexyl group, 5-methylhexyl group, 2-ethylhexyl group, 1-methylhexyl group, 1-ethylpentyl group, 1-propylbutyl group, 3-ethylheptyl group, 2,2-dimethylheptyl group, 1-methylheptyl group, 1-ethylhexyl group, 1-propylpentyl group, 1-methyloctyl group. 1-ethylheptyl group, 1-propylhexyl group, 1-butylpentyl group, 1-methylnonyl group, 1-ethyloctyl group, 1-propylheptyl group, and 1-butylhexyl group;

cycloalkyl groups such as cyclopropyl group, 1-methylcyclopropyl group, cyclobutyl group, cyclopentyl group, cyclohexyl group, cycloheptyl group, 1-methylcyclohexyl group, 2-methylcyclohexyl group, 3-methylcyclohexyl group, 4-methylcyclohexyl group, 1,2-dimethylcyclohexyl group, 1,3-dimethylcyclohexyl group, 1,4-dimethylcyclohexyl group, 2,3-dimethylcyclohexyl group, 2,4-dimethylcyclohexyl group, 2,6-dimethylcyclohexyl group, 2,6-dimethylcyclohexyl group, 3,4-dimethylcyclohexyl group, 3,5-dimethylcyclohexyl group, 2,2-dimethylcyclohexyl group, 3,3-dimethylcyclohexyl group, 4,4-dimethylcyclohexyl group, cyclooctyl group. 2,4,6-trimethylcyclohexyl group, 2,2,6,6-tetramethylcyclohexyl group, 3,3,5,5-tetramethylcyclohexyl group.

The alkyl group has the carbon atoms of preferably 1 to 8, more preferably 1 to 6, and further preferably 1 to 4.

The alkyl group is particularly preferably methyl group, ethyl group, propyl group, or butyl group, and most preferably methyl group.

$R^2$ and $R^3$ are preferably alkyl groups having 1 to 10 carbon atoms, and $R^4$ is preferably a hydrogen atom.

The polyester resin of the present invention comprises constituent moieties represented by the following (L), (M), and (N) as copolymerization constituent moieties. l, m, and n as mentioned above indicate the ratios of the constituent moieties represented by the (L), (M), and (N), and the ratios are values determined by average numbers of the constituent moieties of a molecule represented by integers rounded to one decimal place. The ratios and the average numbers of the moieties in a molecule are determined through analysis by $^1H$-NMR and $^{13}C$-NMR.

[Chemical Formula 4]

(M)

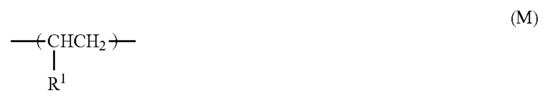

(N)

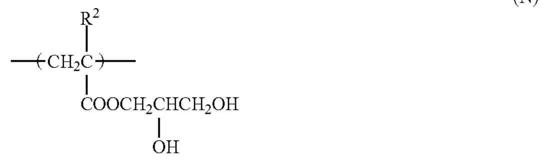

(L)

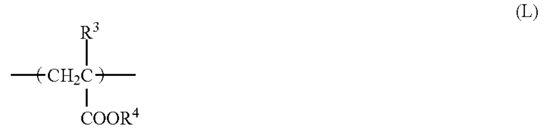

The values of m and n, which represent the ratios of integers, may be the same or different with each other. m and n each represent 1 to 1000, preferably 2 to 800, more preferably 5 to 600, and further preferably 10 to 400.

l represents 0 to 1000, preferably 1 to 700, more preferably 2 to 400, and further preferably 5 to 100.

The compound represented by Formula (I) may be a random copolymer formed from constituent moieties (L), (M), and (N), or a block copolymer in which at least one of the constituent moieties (L), (M), and (N) forms a block, and the compound represented by Formula (I) is preferably a random copolymer.

The polyester resin of the present invention may comprise one or two or more types of polyester resins as far as the polyester resins have m, n, and l satisfying above ranges.

For example, with reference to Patent Documents 1 to 3 and U.S. patent application Ser. Nos. 09/854,350 and 09/614,402, the compound represented by Formula (I) may be prepared in a 2-gallon reactor for free radical continuous polymerization, and a compound with further modified epoxy group is used in the present invention.

The content of the compound represented by Formula (I) is 0.0002 to 5.9% by weight, preferably 0.0005 to 5.0% by weight, further preferably 0.001 to 4.5% by weight, further more preferably 4.0% by weight or less, and particularly preferably 3.5% by weight or less in 100% by weight of the alcohol component of the polyester resin.

The content of the compound represented by Formula (I) of less than 0.0002% by weight may cause drawdown during molding, leading to unstable molding. Even if such resin is molded, a molded article may have thickness unevenness. The content of the compound represented by Formula (I) of more than 5.9% by weight may cause gelation, melt fracture during molding and thus degradation of surface smoothness, resulting in a molded article without transparency. In addition, the molded article contaminated with gel may have low quality.

The compound represented by Formula (I) may have predetermined weight average molecular weight. The weight average molecular weight of the compound represented by Formula (I) is preferably 200 or more and 500000 or less, more preferably 500 or more, further preferably 700 or more, further more preferably 1000 or more, more preferably 300000 or less, further preferably 100000 or less, and further more preferably 50000 or less.

In case where the compound represented by Formula (I) has the weight average molecular weight of less than 200, unreacted compounds may migrate on the surface of the molded article due to bleed out, and the surface thereof may be contaminated. In contrast, in case where the compound represented by Formula (I) has the weight average molecular weight of more than 600000, a void may be generated due to lowered compatibility of the compound with the polyester resin, and the molded article of the polyester resin may be whitened when bent.

The weight average molecular weight can be determined, for example, from measurement results of GPC, which is converted to standard polystyrene.

The weight average molecular weight can be determined, specifically, by weighing 4 mg of a compound represented by Formula (I), dissolving the compound into 4 ml of a mixed solvent of chloroform and hexafluoroisopropanol (60/40; volume %), filtrating a resultant solution through a membrane filter of 0.2 μm, and measuring a filtrated sample solution by GPC followed by conversion of the results to the standard polystyrene.

Examples of the dicarboxylic acid components and the diol components for the present invention are as follows.

Examples of the dicarboxylic acid components include saturated aliphatic dicarboxylic acids such as oxalic acid, malonic acid, succinic acid, glutaric acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 1,3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid, and dimer acid, and ester-forming derivatives thereof (such as alkyl esters thereof, with carbon atoms of 1 or more and 20 or less), unsaturated aliphatic dicarboxylic acids such as fumaric acid, maleic acid, and itaconic acid, and ester forming derivatives thereof (such as alkyl esters thereof, with carbon atoms of 1 or more and 20 or less), and aromatic dicarboxylic acids such as orthophthalic acid, isophthalic acid, terephthalic acid, 5-(alkali metal)sulfoisophthalic acid, diphenic acid. 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 4,4', biphenyldicarboxylic acid, 4,4'-biphenylsulfonedicarboxylic acid, 4,4'-biphenyl ether dicarboxylic acid, 1,2-bis(phenoxy)ethane-p,p'-dicarboxylic acid, pamoic acid, and anthracenedicarboxylic acid, and ester-forming derivatives thereof (such as alkyl esters thereof, with carbon atoms of 1 or more and 20 or less, preferably dimethyl terephthalate).

Among the dicarboxylic acid components, isophthalic acid, terephthalic acid, and naphthalenedicarboxylic acid are preferable, and terephthalic acid is particularly preferable due to physical properties of the obtained polyester resin.

In addition to the dicarboxylic acid, trivalent to tetravalent carboxylic acids may be used in a little amount.

Examples of the carboxylic acids include ethanoic acid, tricarboxylic acid, propanetricarboxylic acid, butanetetracarboxylic acid, pyromellitic acid, trimellitic acid, trimesic acid, and 3,4,3',4'-biphenyltetracarboxylic acid, and ester-forming derivatives thereof (for example, alkyl esters thereof, with carbon atoms of 1 or more and 20 or less).

The alcohol component may comprise a diol component and a compound represented by Formula (I). An amount of the diol component (excluding the compound represented by Formula (I)) is preferably 99.9998 to 94.1% by weight, more preferably 99.9995 to 95% by weight, further preferably 99.999 to 95.5% by weight, particularly preferably 96% by weight or more, and most preferably 96.5% by weight or more in 100% by weight of the alcohol component.

The diol component preferably comprises ethylene glycol. The diol component comprises ethylene glycol in an amount of preferably 85 mol % or more, and more preferably 85 to 99 mol % in 100 mol % of the diol component.

Other than ethylene glycol, examples of the diol components include aliphatic glycols such as 1,2-propylene glycol. 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol. 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, 1,12-dodecanediol, isosorbide, polyethylene glycol (with ethylene constituent units of 4 or more), polytrimethylene glycol, polytetramethylene glycol, and fluorenediol; aromatic glycols such as hydroquinone, 4,4'-dihydroxybisphenol, 1,4-bis (8-hydroxyethoxy)benzene, 1,4-bis(β-hydroxyethoxyphenyl)sulfone, bis(p-hydroxyphenyl)ether, bis(p-hydroxyphenyl)sulfone, bis(p-hydroxyphenyl)methane, 1,2-bis(p-hydroxyphenyl)ethane, bisphenol A, bisphenol F, bisphenol S, bisphenol C. 2,6-naphthalenediol, glycols with ethylene oxides added to the above aromatic glycols, and glycols of hydrogenated bisphenol A, F, S, and C.

In addition to above diol components, trivalent to tetravalent alcohols, hydroxycarboxylic acid, or cyclic ester may be used as the diol component.

Examples of the trivalent to tetravalent alcohols include trimethylolmethane, trimethylolethane, trimethylolpropane, pentaerythritol, glycerol, and hexanetriol.

Examples of the hydroxycarboxylic acids include lactic acid, citric acid, malic acid, tartaric acid, hydroxyacetic acid, 3-hydroxybutyric acid, p-hydroxybenzoic acid, p-(2-hydroxyethoxy)benzoic acid, 4-hydroxycyclohexanecarboxylic acid, and ester-forming derivatives thereof (for example, alkyl esters thereof, with carbon atoms of 1 or more and 20 or less).

Examples of the cyclic esters include ε-caprolactone, β-propiolactone, β-methyl-β-propiolactone, δ-valerolactone, glycolide, and lactide.

In the polyester resin of the present invention, preferably, the dicarboxylic acid component comprises 85 to 100 mol % of terephthalic acid in 100 mol % of the dicarboxylic acid component and the alcohol component (more preferably diol component) comprises ethylene glycol. The diol component comprises ethylene glycol in an amount of preferably 85 to 99 mol % in 100 mol % of the diol component.

The dicarboxylic acid component comprises terephthalic acid in an amount of more preferably 90 to 100 mol %, and further preferably 95 to 100 mol % in 100 mol % of the dicarboxylic acid component. The diol component comprises ethylene glycol in an amount of more preferably 90 to 99 mol %, and further preferably 95 to 99 mol % in 100 mol % of the diol component.

The polyester resin of the present invention is preferably a copolymerized polyethylene terephthalate resin.

The polyester resin of the present invention is a crystalline polyester resin, has branched structures, can improve processability such as moldability by melt strength enhancement according to an increase in molecular weight, and can control melt tension and melt viscosity to predetermined ranges; therefore, whitening on bending and bleed out of unreacted compounds on the surface layer can be prevented in the molded article of the polyester resin.

When the contents of terephthalic acid and ethylene glycol are out of above ranges, the polyester resin becomes amorphous and thus cannot attain high viscosity by solid-phase polymerization; hence, the molded article with high mechanical properties cannot be obtained in some cases.

Further, the content of cyclic oligomers is preferably reduced in the polyester resin of the present invention. The cyclic oligomer is preferably a tetramer, more preferably a tetramer (hereinafter, may be referred to as CT4) formed from a reaction of terephthalic acid with ethylene glycol, i.e., a cyclic tetramer formed from terephthalic acid, ethylene glycol, terephthalic acid, ethylene glycol, terephthalic acid, ethylene glycol, terephthalic acid, and ethylene glycol connected in this order.

The content of the cyclic tetramer in the polyester resin is preferably less than 2680 ppm, more preferably 2650 ppm or less, further preferably 2600 ppm or less, preferably more than 0 ppm, more preferably 1 ppm or more, further preferably 10 ppm or more, and further more preferably 100 ppm or more.

The amount of free CT4 of less than 2680 ppm prevents bleed out on the surface of the molded article and improves the transparency of the molded article and the film, enabling the quality of the molded article and film to be kept high. Further, sufficient transparency can be kept even when a molded product having thick walls and a thick film is formed from a resin containing such amount of free CT4. In case where the amount of free CT4 is 2680 ppm or more, fouling becomes significantly worse at an outlet for resin of a die of an extruder or at a mold of an injection molding machine during continuous formation of film and extrusion of fibers. Further, free CT4 migrated on the surface layer of the molded article due to bleed out may attach to the surface of films, molded articles, or fibers, bringing a decrease in commercial value of product.

The mechanism is unclear, however, it is thought that the structure represented by Formula (I) sterically hinders the ring formation of CT4 and thus enables the content of free CT4 to be controlled to less than 2680 ppm when the polyester resin comprises the constituent moiety derived from dicarboxylic acid component and the constituent moiety derived from alcohol component and the content of the compound represented by the Formula (I) is 0.0002 to 5.9% by weight in 100% by weight of alcohol component.

The polyester resin of the present invention may have predetermined intrinsic viscosity (IV).

The intrinsic viscosity (IV) of the polyester resin is preferably 0.40 to 2.10 dl/g, more preferably 0.50 to 1.90 dl/g, and further preferably 0.60 to 1.70 dl/g.

The intrinsic viscosity can be determined by dissolving the polyester resin into a mixed solvent of p-chlorophenol/tetrachloroethane (weight ratio: 3/1) and subsequently measuring the solution at 30° C. with an Ostwald viscometer.

The polyester resin for the present invention has acid value (AV) of preferably 100 eq/$10^6$ g(ton) or less, more preferably 60 eq/$10^6$ g or less, and further preferably 50 eq/$10^6$ g or less. Lower value is preferable as the lower limit of the acid value, and a value closer to 0 eq/$10^6$ g is preferable. The acid value of more than 100 eq/$10^6$ g causes gelation, leading to a decrease in surface quality and haze in some cases.

The acid value is determined by dissolving a sample of the polyester resin into alcohol or ether solution and titrating the solution with alcoholic sodium hydroxide solution or alcoholic potassium hydroxide solution in the presence of an indicator of phenolphthalein reagent. The measurement method for determination of the acid value is specifically described in Examples.

The polyester resin of the present invention may have a predetermined melting point. The melting point of the polyester resin is preferably from 200 to 300° C., more preferably from 220 to 280° C., further preferably from 240 to 260° C., and further more preferably 250° C. or higher.

The melting point is determined by measuring temperature changes of the resin at a heating rate of 20° C./min up to 300° C. with a differential scanning calorimeter (DSC), and the maximum peak temperature of the heat of fusion is defined as the melting point of crystals.

The polyester resin of the present invention is manufactured preferably with the addition of the polymerization catalyst containing at least an aluminum compound and a phosphorus compound. The amount of the aluminum originating from the polymerization catalyst is preferably 3 to 1000 ppm and the amount of the phosphorus originating from the polymerization catalyst is preferably 5 to 10000 ppm in the polyester resin.

As other polymerization catalysts, one or more compounds selected from a titanium compound and a germanium compound may be used and a combination of a phosphorus compound and a germanium compound may also be used.

The aluminum compound is preferably at least one selected from aluminum acetate, basic aluminum acetate, aluminum chloride, aluminum hydroxide, and aluminum hydroxychloride, more preferably at least one selected from aluminum acetate and basic aluminum acetate, and further preferably aluminum acetate.

The amount of aluminum as the amount of aluminum atom is preferably 3 to 1000 ppm, more preferably 5 to 800 ppm, and further preferably 8 to 500 ppm to the total mass of the polyester resin. A small amount of aluminum may cause a decrease in polymerization activity of catalyst, whereas a large amount of aluminum may cause a high amount of foreign substances originating from aluminum.

The phosphorus compound used as a polymerization catalyst in combination with the aluminum compound will be described. The phosphorus compound is preferably at least one selected from a phosphonic acid compound or a phosphinic acid compound, more preferably a phosphonic acid compound.

The phosphorus compound preferably has a phenolic structure in the same molecule, and the phosphorus compound is more preferably at least one selected from a phosphonic acid compound or a phosphinic acid compound having a phenolic structure in the same molecule, and further preferably a phosphonic acid compound having a phenolic structure in the same molecule.

Examples of the phosphorus compounds having a phenolic structure in the same molecule include p-hydroxyphenylphosphonic acid, dimethyl p-hydroxyphenylphosphonate, diethyl p-hydroxyphenylphosphonate, diphenyl p-hydroxyphenylphosphonate, bis(p-hydroxyphenyl)phosphinic acid, methyl bis(p-hydroxyphenyl)phosphinate, phenyl bis(p-hydroxyphenyl)phosphinate, p-hydroxyphenylphenyl phosphinic acid, methyl p-hydroxyphenylphenylphosphinate, phenyl p-hydroxyphenylphenylphosphinate, p-hydroxyphenylphosphinic acid, methyl p-hydroxyphenylphosphinate, and phenyl p-hydroxyphenylphosphinate, and diethyl 3,5-di-tert-butyl-4-hydroxybenzylphosphonate.

Among them, diethyl 3,5-di-tert-butyl-4-hydroxybenzylphosphonate is particularly preferable as the phosphorus compound. As the phosphorus compound, for example, Irgamod (registered trademark) 295 (manufactured by BASF) can be used.

The amount of phosphorus as the amount of phosphorus atom is preferably 5 to 10000 ppm, more preferably 8 to 8000 ppm, and further preferably 10 to 6000 ppm to the total mass of the polyester resin. A small amount of phosphorus may cause a decrease in polymerization activity of catalyst and thus generates large amount of foreign substances originating from aluminum, whereas a large amount of phosphorus may increase catalyst cost.

Examples of the titanium compounds include tetrabutyl titanate, tetrabenzyltitanium, tetra-n-propyl titanate, tetraisopropyl titanate, tetra-n-butyl titanate, tetraisobutyl titanate, tetra-tert-butyl titanate, tetracyclohexyl titanate, tetraphenyl titanate, tetrabenzyl titanate, lithium oxalate titanate, potassium oxalate titanium, ammonium oxalate titanate, titanium oxide, composite oxide of titanium with silicon, zirconium, alkali metal, or alkaline earth metal, orthoester or condensation orthoester of titanium, reaction product composed of orthoester or condensation orthoester of titanium and hydroxycarboxylic acid, reaction product composed of orthoester or condensation orthoester of titanium, hydroxycarboxylic acid, and phosphorus compound, and reaction product composed of orthoester or condensation orthoester of titanium, polyol having at least two hydroxyl groups, 2-hydroxycarboxylic acid and base. Among them, a composite oxide of titanium with silicon, a composite oxide of titanium with magnesium, and a reaction product composed of orthoester or condensation orthoester of titanium, hydroxycarboxylic acid, and phosphorus compound are preferable.

The amount of titanium as the amount of titanium atom is preferably 1 to 300 ppm, more preferably 2 to 200 ppm, and further preferably 3 to 100 ppm to the total mass of the polyester resin.

The germanium compound may be exemplified with germanium dioxide and germanium acetate, and germanium dioxide is preferable.

The amount of germanium as the amount of germanium atom is preferably 1 to 500 ppm, more preferably 2 to 400 ppm, and further preferably 3 to 300 ppm to the total mass of the polyester resin.

The amounts of the atoms may be calculated, for example, through X-ray fluorescence analysis.

The phosphorus compound used in combination with the germanium compound is exemplified with phosphoric acid; phosphoric acid esters such as trimethyl phosphate, triethyl phosphate, phenyl phosphate and triphenyl phosphate; phosphorous acids and phosphorous acid esters such as trimethyl phosphite, triethyl phosphite, triphenyl phosphite, tris(2,4-di tert butylphenyl)phosphite, and tetrakis(2,4-di-tert-butylphenyl)-4,4'-biphenylene diphosphite.

The polyester resin of the present invention preferably has predetermined melt tension and melt viscosity on melt.

The polyester resin of the present invention has a characteristic that the melt tension decreases as the temperature increases at 250° C. or higher.

The polyester resin of the present invention has the melt tension of preferably 15 mN or more, more preferably 17 mN or more, further preferably 19 mN or more, and the upper limit of, for example, 170 mN or less or 120 mN or less as measured under conditions of a temperature of 270° C., taking up speed of 100 m/min, and a shear rate 243 $s^{-1}$, to attain performance equal to or better than that of high-density polyethylene.

The melt tension can be determined with a capillary rheometer under predetermined conditions (capillary length: 10 mm, capillary diameter: 1 mm, temperature: 270° C., shear rate: 248 $s^{-1}$, maximum taking up speed: 200 m/min, starting speed of taking up: 10 m/min, or taking up speed: 100 m/min (constant), taking up time: 90 sec).

The polyester resin of the present invention also has a characteristic that melt viscosity decreases as the temperature increases at 250° C. or higher, as measured at a shear rate of 2000 $s^{-1}$ on melt.

The polyester resin of the present invention has the melt viscosity of 26000 dPa·s or more as measured under conditions of a temperature of 270° C. and a shear rate of 30 $s^{-1}$, and preferably 6500 dPa·s or less as measured under conditions of a temperature of 270° C. and a shear rate of 2000 $s^{-1}$, in order to prevent melt fracture during melt extrusion. The polyester resin of the present invention shows thixotropy in melt at high temperature, which enables the prevention of melt fracture and good moldability.

The polyester resin has the melt viscosity of preferably 26000 dPa·s or more, more preferably 28000 dPa·s or more, further preferably 30000 dPa·s or more, and the upper limit of, for example, 50000 dPa·s or less or 45000 dPa·s or less, as measured under conditions of a temperature of 270° C. and a shear rate of 30 $s^{-1}$.

The melt viscosity can be measured in accordance with, for example, JIS K 7199.

The polyester resin has the melt viscosity of preferably 6500 dPa·s or less, more preferably 6300 dPa·s or less, further preferably 6200 dPa·s or less, and the lower limit of, for example, 5500 d Pa·s or more, as measured under conditions of a temperature of 270° C. and a shear rate of 2000 $s^{-1}$.

The melt viscosity can be determined with a capillary rheometer under predetermined conditions (capillary length: 10 mm, capillary diameter: 1 mm, temperature: 270° C., shear rate: 30 $s^{-1}$ or 2000 $s^{-1}$).

The polyester resin of the present invention may have a predetermined thermal oxidative degradation parameter (TOD) from the viewpoint of heat-resistance, and TOD of the polyester resin is preferably 0.390 or less. TOD can be calculated by the method described in an item in Examples. TOD is more preferably 0.385 or less, further preferably 0.380 or less, particularly preferably 0.375 or less, and most preferably 0.370 or less. The lower limit of TOD is, for example, 0.010 or more, 0.015 or more, or 0.020 or more. TOD of more than 0.390 may cause a decrease in moldability due to drawdown.

The polyester resin of the present invention may contain additives such as organic, inorganic, or organometallic toner, and a fluorescent brightener. By containing one or two or more types of the additives, yellowing or other coloration of the polyester resin will be controlled to an excellent level. The polyester resin may also contain any other polymer, a static controller, a defoaming agent, a die improver, a dye, a pigment, a delustering agent, a fluorescent brightener, a stabilizer, an antioxidant, and other additives. The antioxidant of aromatic amine or phenol may be used, and the stabilizer of phosphorus, such as phosphoric acid and phosphoric acid ester, sulfur, or amine may be used.

The polyester resin may be directly introduced to the process of molding in either a melt after the step of melt polycondensation as described above or a chip after treatment such as solid-phase polymerization, to form a molded product. Predetermined amount of additive, such as a crystal nucleating agent, an aldehyde reducing agent, a color improver, and a stabilizer, may be added in any reactor or transportation piping in the production process of polymer by melt polycondensation, to produce a polyester resin having desired properties. Thus obtained polyester resin may be, optionally after treatment such as solid-phase polymerization, directly sent to a molding process to form the molded product.

The molded article formed from the polyester resin of the present invention may have a predetermined three dimensional center plane average surface roughness (SRa). The molded article of the polyester resin has SRa of preferably less than 0.15 μm, more preferably 0.14 μm or less, further preferably 0.13 μm or less, further more preferably 0.12 μm or less, and preferably 0.01 μm or more or 0.02 μm or more.

The three-dimensional center plane average surface roughness (SRa) can be determined, for example, by a roughness measuring device (surface roughness measuring instrument, Surfcorder ET4000A, manufactured by Kosaka Laboratory Ltd.).

2. Production Method for Polyester Resin

The polyester resin of the present invention can be manufactured by conventionally known method. For example, PET is produced by direct esterification method in which esterification is first performed through the direct reaction of terephthalic acid, ethylene glycol, and, if necessary, other copolymerization components with distilling off of water, followed by subsequent polycondensation under reduced pressure. Alternatively, PET can be produced by transesterification method in which transesterification is first performed through reaction of dimethyl terephthalate, ethylene glycol, and, if necessary, with other copolymerization components with distilling off of methyl alcohol, followed by subsequent polycondensation under reduced pressure. Furthermore, if necessary, solid phase polymerization may be performed to increase intrinsic viscosity. In order to promote crystallization of the polyester resin before solid phase polymerization, polyester obtained by melt polymerization may be allowed to absorb moisture and then crystallized by heat, or may be sprayed with water vapor directly onto polyester chips and crystallized by heat.

The compound represented by Formula (I) is preferably added in the process of polymerization.

The compound represented by Formula (I) may be added in dispersed state.

The above polycondensation reaction may be performed in a batch reactor or in a continuous reactor. In either method, esterification reaction and transesterification reaction may be carried out in one stage or separately in multiple stages. The polycondensation reaction may be carried out in one stage or separately in multiple stages. Similarly to the polycondensation reaction, the solid phase polymerization reaction may be carried out in a batch reactor or in a continuous reactor. The polycondensation reaction and the solid phase polymerization reaction may be carried out in succession or separately.

An exemplary preferred method for manufacturing a polyester resin in a continuous manner will now be described with an example of PET.

The esterification reaction is carried out with reflux of ethylene glycol while water or alcohol produced in the reaction is being removed from the system out of a rectifying column, in multi-stage apparatus including 1 to 3 esterification reactors connected in series. A temperature for the esterification reaction at the first stage is preferably 240 to 270° C., preferably 245 to 265° C., a pressure for the reaction is preferably 0.2 to 3 $kg/cm^2G$, and more preferably 0.5 to 2 $kg/cm^2G$. At the final stage, a temperature for the esterification reaction is normally 250 to 290° C., preferably 255 to 275° C., a pressure for the reaction is normally 0 to 1.5 $kg/cm^2G$, and preferably 0 to 1.3 $kg/cm^2G$. In case where the reaction is carried out in 3 or higher stages, conditions for esterification reaction at an intermediate stage are conditions in between the reaction conditions for the first and final stages. In the esterification reaction, preferably, an increase in the reaction rate is smoothly distributed among stages. The reaction rate of esterification finally reaches preferably 90% or more, and more preferably 93% or more. Low-order condensate having molecular weight of about 500 to 5000 can be obtained by the esterification reaction.

In case where terephthalic acid is used as a raw material in the esterification reaction, the reaction can be carried out without catalyst due to catalytic action as an acid of the terephthalic acid, however, the reaction may be carried out in the presence of polycondensation catalyst.

The polycondensation reaction may be carried out with addition of small amount of tertiary amine such as triethylamine, tri-n-butylamine, and benzyldimethylamine; a quaternary ammonium hydroxide such as tetraethylammonium hydroxide, tetra-n-butylammonium hydroxide, and trimethylbenzylammonium hydroxide; and a basic compound such as lithium carbonate, sodium carbonate, potassium carbonate, and sodium acetate. The reaction is preferred because such compounds enables the proportion of the dioxyethylene terephthalate component unit in the main chain of the polyethylene terephthalate to be maintained at a relatively low level (5 mol % or less to the whole diol component).

A polymer with low molecular weight can be manufactured by transesterification reaction, by continuously supplying a solution containing ethylene glycol in an amount of preferably 1.1 to 3.0 mol, more preferably 1.2 to 2.5 mol to 1 mol of dimethyl terephthalate, in the process of transesterification reaction.

The transesterification reaction is carried out with reflux of ethylene glycol while methanol produced in the reaction is being removed from the system out of a rectifying column, in apparatus including 1 to 2 esterification reactors connected in series. A temperature for the transesterification reaction at the first stage is preferably 180 to 250° C., more preferably 200 to 240° C., a temperature for the transesterification reaction at the final stage is normally 230 to 270° C., and preferably 240 to 265° C. Examples of the transesterification catalysts include fatty acid salts or carbonates of Zn, Cd, Mg, Mn, Co, Ca, and Ba and oxides of Pb, Zn. Sb, and Ge. The transesterification reaction conducted under such conditions brings a low order condensate having molecular weight of about 200 to 500.

Subsequently, thus obtained low-order condensate is sent to liquid phase polycondensation step of multi-stage. As conditions for the polycondensation reaction, a reaction temperature for polycondensation is preferably 250 to 290° C., more preferably 260 to 280° C., a pressure is preferably 500 to 20 Torr, and more preferably 200 to 30 Torr at the first stage. At the final stage, a reaction temperature for polycondensation is preferably 265 to 800° C., more preferably 275 to 295° C., a pressure is preferably 10 to 0.1 Torr, and more preferably 6 to 0.5 Torr for polycondensation. In case where the reaction is carried out in 3 or higher stages, conditions for polycondensation reaction at an intermediate stage are conditions in between the reaction conditions for the first and final stages. The degree of increase in intrinsic viscosity reached in each process of the polycondensation reaction is preferably smooth.

The polyester resin obtained by polycondensation is then polymerized in solid-phase by conventionally known method. First, the polyester resin is pre-crystallized, for example, by heating at a temperature of 100 to 190° C. for 1 to 5 hours in an inert gas or under reduced pressure, or in an atmosphere of water vapor or an inert gas containing water vapor. Subsequently, solid-phase polymerization is performed at a temperature of 190 to 230° C. for over 1 to 50 hours in an atmosphere of inert gas or under reduced pressure.

The catalyst used in the present invention has catalytic activity in polycondensation reaction as well as esterification and transesterification reactions. The catalyst can be used, for example, in transesterification reaction of alkyl ester of dicarboxylic acid such as dimethyl terephthalate, and glycol such as ethylene glycol. The catalyst used in the present invention has catalytic activity in melt polymerization as well as solid-phase polymerization and solution polymerization, enabling the manufacture of the polyester resin in each method.

The polymerization catalyst used in the present invention may be added to the reaction system at any stage of the polymerization reaction. The polymerization catalyst may be added to the reaction system, for example, at any stage before the start of or during the esterification reaction or the transesterification reaction, or at any stage before the start of or during the polycondensation reaction. In particular, aluminum or aluminum compound is preferably added immediately before the start of polycondensation reaction.

Except for phosphorus compound, the polymerization catalysts for the present invention may be added in any manner, for example, in powder form or neat form, or in slurry or solution form dispersed in a solvent, such as glycol. Aluminum, aluminum compound, phosphorus compound, and/or other components may be mixed in advance to be added as a mixture, or each component may be separately added. Aluminum, aluminum compound, phosphorus compound, and/or other components may be added to polymerization system at the same time, or at different times. A whole amount of catalyst may be added at one time or in multiple additions.

The polyester resin of the present invention is preferably subjected to blow molding (more preferably direct blow molding) after the polycondensation and the solid phase polymerization. A heat-resistant bottle is formed from the precursor provided with a bottom, which is generally known as a preform, by blow molding. The preform is stretched in a mold by blown molding, optionally with subsequent heat-set treatment. The preform is formed by injection molding or compression molding method. In the case of the injection molding, the polyester resin is heated and melted at 260 to 350° C. and injected into a mold to form a preform. Normally, a preform is in the shape of thick-walled test tube with a gate portion disposed at its bottom portion and an opening portion processed for a screw-cap.

The opening portion of the preform for heat-resistant bottle may be crystallized. Due to crystallization, the opening portion can be prevented from being deformed, even when a bottle is filled with high temperature contents. The crystallization of the opening portion is conducted by heating preferably at 130 to 200° C., more preferably at 140 to 190° C., by heating methods, such as infrared heater, hot air, induction heating, and an immersion in an oil bath, and infrared heater is preferable from the point of productivity. The crystallization of the opening portion by heating may be performed after blow molding.

The bottle is obtained by heating the preform and then stretching in the direction of the bottle length (longitudinal direction) together with blow molding in the circumferential direction. The preform is normally stretched with a stretch rod in the length direction and blow molded with pressurized gas, such as air and nitrogen, in the circumferential direction. The pressurized gas is blown at preferably 1 to 10 MPa. Preferred is a method in which a preform is simultaneously stretched in both the length and circumferential directions by blowing pressurized gas simultaneously with insertion of a stretch rod. Alternatively, a preform may be stretched first in the length direction and then stretched in the circumferential direction. The preform is heated by infrared heater, hot air, or induction heating. A heating temperature is normally 80 to 130° C., and preferably 90 to 120° C.

The lower limit of the stretching ratio in the direction of the bottle length is preferably 1.5 times and more preferably 2 times. The stretching ratio of less than the range may cause nonuniform stretching. The upper limit of the stretching ratio in the direction of the bottle length is preferably 6 times, more preferably 5 times, and further preferably 4 times. The stretching ratio exceeding the range may cause tearing of the preform.

The lower limit of the stretching ratio in the circumferential direction of the bottle is preferably 2 times and more preferably 2.5 times. The stretching ratio of less than the range may cause nonuniform stretching. The upper limit of the stretching ratio in the circumferential direction of the bottle is preferably 6 times, more preferably 5 times, and further preferably 4 times. The stretching ratio exceeding the range may cause tearing of the preform.

In case where heat set is continuously conducted in the same mold after blow molding, the lower limit of the temperature of the mold for blow molding is preferably 80° C., more preferably 120° C., further preferably 130° C., and most preferably 140° C. The temperature of less than the range may cause insufficient crystallization in later process of heat set, resulting in insufficient heat resistance. Such lower temperature than the range may also need longer heat set time and may lower productivity.

The upper limit of the temperature of the mold is preferably 350° C., more preferably 340° C., further preferably 330° C., and particularly preferably 320° C. The lower limit of the temperature of the mold is preferably 280° C., more preferably 290° C., and further preferably 300° C.

The polyester resin of the present invention has a characteristic that melt tension decreases with an increase in temperature when melted. A high temperature of the mold enables a decrease in melt tension by contact of the polyester resin to the mold, and reduces generation of melt fracture. In addition, melt tension of the polyester resin increases after discharge of the resin from the mold, and reduces generation of drawdown.

A blow molded bottle is subsequently subjected to heat set in the same mold. The lower limit of the heat set time is preferably 0.5 seconds, more preferably 1 second, and further preferably 1.5 seconds. The heat set time of less than the range may cause insufficient promotion of crystallization, leading to insufficient heat-resistance. The upper limit of the heat set time is preferably 15 seconds, more preferably 10 seconds, and further preferably 5 seconds. Longer heat set time may lower productivity. Further, a rotary type of a blow molding machine requires a large assortment of molds, and such an enlarged equipment is uneconomic. After heat set in a mold, further, the bottle may be additionally heat set by heating by infrared rays, hot air, or induction heating.

Alternatively, blow molding may be performed in a mold set at a temperature of 5 to 50° C. with subsequent heat set in the same mold. In this case, the temperature of the mold for heat set is the same with above mold temperatures.

The equipment for blow molding may be provided with one mold. The equipment may be provided with a plurality of molds for mass production, and these molds sequentially move preferably between positions for setting a heated preform into a mold, for stretching, for heat set, and for ejection of a bottle in this order.

In above description, the bottle is produced by cold parison method, in which a preform is cooled and then reheated, however, the bottle can be produced by hot parison method, in which blow molding is performed with incomplete cooling of preform.

The bottle is molded to have the size of preferably 200 ml to 6 L, and more preferably 300 ml to 2 L. The body of the bottle may have any shape, such as circular, quadrilateral (including cut corners), and hexagonal shapes.

The polyester resin of the present invention is subjected to blow molding (preferably direct blow molding) and the obtained bottle is applied suitably as a container (for example, a bottle) for cosmetics, detergents, beverages, and the like.

The present application claims benefit of priority to Japanese Patent Application No. 2020-207927 filed on Dec. 15, 2020. The entire contents of the specification of Japanese Patent Application No. 2020-207927 filed on Dec. 15, 2020 are incorporated herein by reference.

EXAMPLES

Hereinafter, the present invention will be specifically described with Examples, however, the scope of the present invention is not limited to Examples.

Measurement of Intrinsic Viscosity (IV) of Polyester Resin

The polyester resin was dissolved into a mixed solvent of p-chlorophenol/tetrachloroethane (weight ratio: 3/1), and intrinsic viscosity was measured at 30° C. with an Ostwald viscometer.

Measurement of Composition of Polyester Resin

The polyester resin dissolved in a solvent of chloroform-d was analyzed by $^1$H-NMR and $^{13}$C-NMR with Fourier transform nuclear magnetic resonance device (AVANCE NEO 600, manufactured by Bruker) to determine its composition from the resultant integration ratio.

Measurement of Melting Point of Polyester Resin

Five milligrams of the polyester resin was placed in an aluminum sample pan, and the sample pan was closed with a lid. The melting point of the sample was then measured with a differential scanning calorimeter (DSC, model: DSC-Q100, manufactured by TAInstruments) while heating up to 300° C. at a heating rate of 20° C./min, and the maximum peak temperature of the heat of fusion was determined as a melting point of crystals.

Measurement of Gel

In a round-bottom flask equipped with a stirrer, 30 g of polyester pellets obtained by melt polycondensation and 300 ml of a mixed solution of p-chlorophenol/tetrachloroethane (weight ratio: 3/1) were placed, and the polyester pellets were dissolved into the mixed solvent at 100 to 105° C. with stirring over 2 hours. The whole solution was then allowed to cool to room temperature and filtrated through a membrane filter made of polytetrafluoroethylene and having a diameter of 47 mm and a pore size of 1.0 μm (PTFE membrane filter, product name: T100A047A, manufactured by Advantec) under pressure of 0.15 MPa to separate foreign substances from the solution. In the filtration, the effective filtration diameter was 37.5 mm. After the completion of the filtration, the membrane filter was subsequently washed with 300 ml of chloroform, and the membrane filter was dried at 30° C. for a whole day and night under reduced pressure. The filtration surface of the membrane filter was observed with an optical microscope to evaluate undissolved matter (gel) according to the following criteria.

Good: the number of gel is 0
Average to good: the number of gel is 1 to 4
Average: the number of gel is 5 to 10
Bad: the number of gel is 11 or more

Measurement of Melt Tension

Melt tension was measured while the polyester resin was being molded, with the following apparatus and conditions.

Capillary rheometer (manufactured by Toyo Seiki Seisaku-sho, Ltd.)
Temperature: 270° C.
Capillary length: 10 mm
Capillary diameter: 1 mm
Shear rate: 243 $s^{-1}$
Maximum speed of taking up: 200 m/min
Starting speed of taking up: 10 m/min
Speed of taking up: 100 m/min (constant)
Time of taking up: 90 sec

Measurement of Melt Viscosity

Melt viscosity was measured while the polyester resin was being molded, with the following apparatus and conditions.

Capillary rheometer (manufactured by Toyo Seiki Seisaku-sho, Ltd.)
Capillary length: 10 mm
Capillary diameter: 1 mm
Temperature: 270° C.
Shear rate: 30 $s^{-1}$ or 2000 $s^{-1}$

Measurement of Acid Value (Terminal Carboxyl Group Concentration (Represented as Acid Value, Unit: Eq/Ton))

To prepare a titrand, 0.5 g of the polyester resin was dissolved in 25 ml of benzyl alcohol, and the solution was titrated against 0.01 mol/l sodium hydroxide in benzyl alcohol solution to determine an acid value of the polyester resin. A solution prepared by dissolving 0.10 g of phenolphthalein into a mixed solution of 50 ml of ethanol and 50 ml of water was used as an indicator.

Measurement for Quantification of Aluminum Atom, Phosphorus Atom, Germanium Atom, and Titanium Atom in Polyester Resin A sample piece was prepared through melting the polyester resin by heating to a temperature which is +20° C. higher than the melting point, in a stainless circular ring with a thickness of 5 mm and an inner diameter of 50 mm. Then, elements in the polyester resin were qualified by X-ray fluorescence analysis. The result was expressed by the unit of ppm. For the quantification, a standard curve predetermined by measuring samples containing known quantities of the elements was used.

Profile Extrusion Molding (Evaluations of Moldability (Drawdown), Mechanical Properties, Surface Smoothness, and Transparency)

The equipment for profile extrusion molding was prepared as follows. A die lip was attached to a monoaxial extruder (L/D=30, equipped with a full flight screw, screw diameter: 50 mm), and a sizing die for determination of final dimensions of profile extrusion products was mounted on the tip of cooling water bath. Then, a pulling machine was installed next to the water bath to obtain an equipment for profile extrusion molding. The polyester resin was molded with the above equipment in which a temperature of a cylinder was set to 270° C. The resin drawdown which occurred during molding, and mechanical properties, surface smoothness, and transparency of the obtained molded article were evaluated according to the following criteria. The evaluation results are shown in Table 2.

Evaluation of Moldability (Drawdown)

Drawdown of the polyester resin was evaluated according to the following criteria.

Very good: no hanging down of the polyester resin occurs, allowing a molded shape to be kept.

Good: very little amount of the polyester resin hangs down during molding.

Average: the polyester resin hangs down during molding, resulting in unstable mass production.

Bad: hanging down of the polyester resin during molding occurs, making it difficult for the polyester resin to be discharged to a sizing mold.

Evaluation of Mechanical Properties (Strength)

A molded article of the polyester resin was bent by 180° and evaluated according to the following criteria.

Good: absence of a crack or cracks

Bad: presence of a crack or cracks

Evaluation of Surface Smoothness

The smoothness of the outer surface of the molded article of the polyester resin was measured with a surfcorder (Et4000A, manufactured by Kosaka Laboratory Ltd.) and evaluated based on a three-dimensional center plane average surface roughness (SRa) according to the following criteria.

Very good: SRa is less than 0.1 μm.

Good: SRa is 0.1 μm or more and less than 0.15 μm.

Bad: SRa is 0.15 μm or more.

Evaluation of Transparency

The molded article of the polyester resin was cut to a square having a side of 3 cm. Transparency was measured with a haze meter (NDH-5000, manufactured by NIPPON DENSHOKU INDUSTRIES CO., LTD.) and evaluated according to the following criteria.

Very good: haze is less than 5%.

Good: haze is 5% or more and less than 10%.

Bad: haze is 10% or more.

Evaluation of Heat Resistance (Thermal-Oxidative Decomposition Parameter (TOD))

The polyester resin in the form of a chip ($[IV]_i$) was frozen and ground into powder having the size of 20-mesh or less. The powder was vacuum dried at 130° C. for 12 hours, 300 mg of the dried powder was then put into a glass test tube having an inner diameter of about 8 mm and a length of about 140 mm, and vacuum dried at 70° C. for 12 hours. Then, a drying tube containing silica gel was mounted to the upper portion of the glass test tube to dry the air in the test tube, and the test tube containing the powder was immersed in a bath of nitrate at a temperature of 230° C. to measure $[IV]_{f1}$ of the powder after heating for 15 minutes. TOD was determined as follows, with the provisos that $[IV]_i$ denotes IV (dL/g) before the heat test and $[IV]_{f1}$ denotes IV (dL/g) after the heat test. The resin chip was frozen and ground with a freezer mill (model: 6750, manufactured by SPEX CentriPrep in U.S.A.). In a dedicated cell, about 2 g of the resin chips and a special impactor were placed, and the cell was then set to the mill. The mill was filled with liquid nitrogen and kept for about 10 minutes, and the resin chips were ground at RATE 10 (the impactor was reciprocated about 20 times per second) for 5 minutes.

$$TOD=0.245\{[IV]_{f1}^{-1.47}-[IV]_i^{-1.47}\}$$

The polyester resin having smaller TOD has higher heat resistance.

Evaluation of CT4 Content

Fifty milligrams of the polyester resin was dissolved into 1 ml of a mixed solution of hexafluoroisopropanol/chloroform (ratio by volume=1/9), further, the solution was diluted with 4 ml of chloroform. To the solution, 10 ml of methanol was then added to precipitate the polyester resin, and the resulting solution containing the precipitate was centrifuged. The supernatant separated by centrifugation was concentrated and evaporated to dryness, re-dissolved with 0.4 ml of dimethylformamide, and the content of CT4 was measured by high performance liquid chromatograph.

Apparatus: ACQUITY UPLC (manufactured by Waters Corporation)

Column: BEH-C18 2.1×150 mm (manufactured by Waters Corporation)

Evaluation of Transparency in Continuous Molding

The polyester resin was dried and introduced to an extruder for sheet equipped with a die for continuous molding into a sheet having a thickness of about 0.5 mm at 280° C. for 2 days. Fouling of the resin on the die outlet and the surface condition of the sheet were visually evaluated according to the following criteria.

Evaluation Criteria

Very good: the die outlet has almost no fouling and the sheet has good surface condition Good: the die outlet has very slight fouling and the sheet has good surface condition Average: the die outlet has slight fouling and the sheet has a few foreign substances on the surface of the sheet Bad: the die outlet has significant fouling and the sheet has many foreign substances attaching on the surface of the sheet

Synthesis Examples 1 to 6

Preparation of Compounds (Branching Agents) Represented by Formula (I)

With reference to Patent Documents 1 to 3 and U.S. patent application Ser. Nos. 09/354,350 and 09/614,402, a compound represented by Formula (I) was prepared in the system of 2-gallon reactor for free radical continuous polymerization. The composition and weight average molecular weight of the compounds represented by Formula (I) obtained in Synthesis Examples 1 to 6 are shown in the following Table 1.

The weight average molecular weight of the compounds represented by Formula (I) was determined by GPC based on the standard polystyrene. Specifically, 4 mg of a compound represented by Formula (I) was weighed, dissolved into 4 ml of a mixed solvent of chloroform and hexafluoroisopropanol (60/40: volume %), and filtrated through a membrane filter of 0.2 μm. The sample solution was then subjected to GPC, and the weight average molecular weight with conversion into the standard polystyrene was determined.

In addition, l, m, and n recited in the compound represented by Formula (I) were determined through analyses by $^1$H-NMR and $^{13}$C-NMR to an integers rounded to one decimal place, and indicated the average numbers of constituent moieties. Specifically, the sample of a compound represented by Formula (I) was dissolved into a mixed solvent of deuterated chloroform and trifluoroacetic acid (volume ratio: 85/15) for analysis by 1H-NMR, and into deuterated chloroform or a mixed solvent of deuterated chloroform and hexafluoroisopropanol (volume ratio: 1/1) for analysis by $^{13}$C-NMR, and the sample solution was measured with Fourier transform nuclear magnetic resonance device (AVANCE NEO 600, manufactured by Bruker) under measurement conditions of room temperature and integration times of 50 to 200 ($^{1}$H-NMR) and 10000 ($^{18}$C-NMR). Ratios of each component and components located at terminals were calculated from the spectra obtained by JH-NMR and $^{13}$C-NMR to determine l, m, and n.

The compounds represented by Formula (I) used in Synthesis Examples have the following methacrylic monomer constituent unit (hereinafter, merely DEMA constituent unit). In the formula, * represents a bond with other constituent unit of monomer, such as styrene constituent unit and methyl methacrylate constituent unit. For example, a compound containing DEMA constituent unit can be obtained from a synthesis method involving ring-opening reaction of glycidyl methacrylate with water. In addition, the compound represented by Formula (I) may be obtained by a synthesis method through formation of a copolymer of styrene and glycidyl methacrylate (further with methyl methacrylate, if needed) with reference to Patent Documents 1 to 3 and U.S. patent application Ser. Nos. 09/354,350 and 09/614,402 followed by subsequent ring opening reaction of the copolymer with water.

<DEMA Constituent Unit>

[Chemical Formula 5]

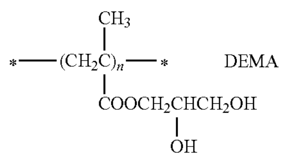

DEMA

In Table 1, the following abbreviations STY, MMA, and DEMA each represent styrene constituent unit, methyl methacrylate constituent unit, and DEMA constituent unit (methacrylic monomer constituent unit in above chemical formula).

TABLE 1

| Synthesis Example | Composition | m | n | l | Weight average molecular weight |
|---|---|---|---|---|---|
| 1 | STY | 1 | | | 218 |
| | DEMA | | 1 | | |
| 2 | STY | 5 | | | 748 |
| | DEMA | | 2 | | |
| 3 | STY | 30 | | | 3576 |
| | DEMA | | 4 | | |
| 4 | STY | 57 | | | 6954 |
| | DEMA | | 9 | | |
| 5 | STY | 200 | | | 37900 |
| | DEMA | | 150 | | |
| 6 | STY | 57 | | | 7054 |
| | DEMA | | 9 | | |
| | MMA | | | 10 | |

Example 1

In a 10 L pressure vessel equipped with a stirrer, a thermometer, and a condenser for distillation, 2593 g of terephthalic acid (manufactured by Mitsui Chemicals, Inc.), 1937 g of ethylene glycol (manufactured by NIPPON SHOKUBAI CO., LTD.), and 4 g of triethylamine (manufactured by NACALAI TESQUE, INC.) were charged, and subjected to esterification at 240° C. for 3.0 hours under pressure of 0.35 MPa. The compound represented by Formula (I) obtained in Synthesis Example 1 was continuously added to the polyester obtained through the esterification at a controlled flow velocity, so that the amount of the compound represented by Formula (I) became 0.2% by weight relative to 100% by weight of the alcohol component in the obtained polyester resin, and the reaction was proceeded stepwise.

Aluminum acetate and Irgamod 295 (manufactured by BASF) for a polycondensation catalyst were added so that the amount of aluminum atom (Al) was 30 ppm and the amount of phosphorus atom (P) was 72 ppm, respectively, to the mass of the polyester resin. Then, 'Solvent Blue 45' (manufactured by Clariant AG) was added so that the amount thereof was 1 ppm to the polyester resin, and the polyester resin was stirred at 260° C. for 5 minutes in an atmosphere of nitrogen at normal pressure. After that, the temperature was raised to 280° C. over 60 minutes with gradual decrease in pressure in the reaction system to 13.3 Pa (0.1 Torr), and polycondensation reaction was further conducted at 280° C. and 13.3 Pa. The pressure in the system was raised back to normal pressure with nitrogen, and the resin under slight pressure was discharged into cold water in a strand shape and rapidly cooled. The resin was then kept in the cold water for 20 seconds and cut into cylindrical polyester pellets with a length of about 3 mm and a diameter of about 2 mm.

The polyester pellets obtained by melt-polymerization were dried under reduced pressure (under the conditions of 80° C. and 13.3 Pa or less for 12 hours), and subsequently subjected to crystallization treatment (under the conditions of 130° C. and 13.3 Pa or less for 3 hours, and under the conditions of 160° C. and 13.3 Pa or less for further 3 hours). After cooling, the polyester pellets were subjected to solid-phase polymerization in a solid-phase polymerization reactor kept at pressure of 13.3 Pa or less and a temperature ranging from 200° C. to 220° C., to obtain polyester pellets with intrinsic viscosity (IV) of 1.18 dl/g, acid value (AV) of 15 eq/ton, and TOD of 0.015.

Example 2

Example 2 was conducted under the same polymerization conditions as Example 1 except that the addition amount of the compound represented by Formula (I) obtained in Synthesis Example 1 was changed to 0.001% by weight, to obtain polyester pellets with intrinsic viscosity (IV) of 1.17 dl/g, an acid value (AV) of 20 eq/ton, and TOD of 0.015.

Example 3

Example 3 was conducted under the same polymerization conditions as Example 1 except that the addition amount of the compound represented by Formula (I) obtained in Synthesis Example 1 was changed to 3.0% by weight, to obtain polyester pellets with intrinsic viscosity (IV) of 1.20 dl/g, acid value (AV) of 20 eq/ton, and TOD of 0.010.

Example 4

Example 4 was conducted under the same polymerization conditions as Example 1 except that the compound represented by Formula (I) obtained in Synthesis Example 1 was changed to a compound represented by Formula (I) obtained in Synthesis Example 2, and the addition amount of the compound was changed to 0.2% by weight, to obtain polyester pellets with intrinsic viscosity (IV) of 1.20 dl/g, acid value (AV) of 18 eq/ton, and TOD of 0.015.

Example 5

Example 5 was conducted under the same polymerization conditions as Example 1 except that the compound represented by Formula (I) obtained in Synthesis Example 1 was changed to a compound represented by Formula (I) obtained in Synthesis Example 3, and the addition amount of the compound was changed to 0.2% by weight, to obtain polyester pellets with intrinsic viscosity (IV) of 1.15 dl/g, acid value (AV) of 19 eq/ton, and TOD of 0.015.

Example 6

Example 6 was conducted under the same polymerization conditions as Example 1 except that the compound represented by Formula (I) obtained in Synthesis Example 1 was changed to a compound represented by Formula (I) obtained in Synthesis Example 4, and the addition amount of the compound was changed to 0.2% by weight, to obtain polyester pellets with intrinsic viscosity (IV) of 1.14 dl/g, acid value (AV) of 17 eq/ton, and TOD of 0.015.

Example 7

Example 7 was conducted under the same polymerization conditions as Example 1 except that the compound represented by Formula (I) obtained in Synthesis Example 1 was changed to a compound represented by Formula (I) and obtained in Synthesis Example 5, and the addition amount of the compound was changed to 0.2% by weight, to obtain polyester pellets with intrinsic viscosity (IV) of 1.09 dl/g, acid value (AV) of 20 eq/ton, and TOD of 0.015.

Example 8

Example 8 was conducted under the same conditions as Example 1 except that the compound represented by Formula (I) obtained in Synthesis Example 1 was changed to a compound represented by Formula (I) obtained in Synthesis Example 6, and the addition amount of the compound was changed to 0.2% by weight, to obtain polyester pellets with intrinsic viscosity (IV) of 1.08 dl/g, acid value (AV) of 19 eq/ton, and TOD of 0.015.

Example 9

In a 10 L pressure vessel equipped with a stirrer, a thermometer, and a condenser for distillation, 2593 g of terephthalic acid (manufactured by Mitsui Chemicals, Inc.), 1257 g of ethylene glycol (manufactured by NIPPON SHOKUBAI CO., LTD.), and 4 g of triethylamine (manufactured by NACALAI TESQUE, INC.) were charged, and subjected to esterification at 240° C. for 1.5 hours under pressure of 0.35 MPa. The compound represented by Formula (I) obtained in Synthesis Example 1 was continuously added to the polyester obtained through the esterification at a controlled flow velocity, so that the amount of the compound represented by Formula (I) became 0.2% by weight relative to 100% by weight of the alcohol component in the obtained polyester resin, and the reaction was proceeded stepwise.

Aluminum acetate and Irgamod 295 (manufactured by BASF) for a polycondensation catalyst were added so that the amount of aluminum atom (Al) was 30 ppm and the amount of phosphorus atom (P) was 72 ppm, respectively, to the mass of the polyester resin. Then, 'Solvent Blue 45' (manufactured by Clariant AG) was added so that the amount thereof was 1 ppm to the polyester resin, and the polyester resin was stirred at 260° C. for 5 minutes in an atmosphere of nitrogen at normal pressure. After that, the temperature was raised to 280° C. over 60 minutes with gradual decrease in pressure in the reaction system to 13.3 Pa (0.1 Torr), and polycondensation reaction was further conducted at 280° C. and 13.3 Pa. The pressure in the system was raised back to normal pressure with nitrogen, and the resin under slight pressure was discharged into cold water in a strand shape and rapidly cooled. The resin was then kept in the cold water for 20 seconds and cut into cylindrical polyester pellets with a length of about 3 mm and a diameter of about 2 mm.

The polyester pellets obtained by melt polymerization were dried under reduced pressure (under the conditions of 80° C. and 13.3 Pa or less for 12 hours), and subsequently subjected to crystallization treatment (under the conditions of 130° C. and 13.3 Pa or less for 3 hours, and under the conditions of 160° C. and 13.3 Pa or less for further 3 hours). After cooling, the polyester pellets were subjected to solid-phase polymerization in a solid-phase polymerization reactor kept at pressure of 13.3 Pa or less and a temperature ranging from 200° C. to 220° C. to obtain polyester pellets with intrinsic viscosity (IV) of 1.18 dl/g, acid value (AV) of 45 eq/ton, and TOD of 0.020.

Example 10

In a 10 L pressure vessel equipped with a stirrer, a thermometer, and a condenser for distillation, 2593 g of terephthalic acid (manufactured by Mitsui Chemicals, Inc.), 976 g of ethylene glycol (manufactured by NIPPON SHOKUBAI CO., LTD.), and 4 g of triethylamine (manufactured by NACALAI TESQUE, INC.) were charged, and subjected to esterification at 240° C. for 1 hour under pressure of 0.35 MPa. The compound represented by Formula (I) obtained in Synthesis Example 1 was continuously added to the polyester obtained through the esterification at a controlled flow velocity, so that the amount of the compound represented by Formula (I) became 0.2% by weight relative to 100% by weight of the alcohol component in the obtained polyester resin, and the reaction was proceeded stepwise.

Aluminum acetate and Irgamod 295 (manufactured by BASF) for a polycondensation catalyst were added so that the amount of aluminum atom (Al) was 30 ppm and the amount of phosphorus atom (P) was 72 ppm, respectively, to the mass of the polyester resin. Then, 'Solvent Blue 45' (manufactured by Clariant AG) was added so that the amount thereof was 1 ppm to the polyester resin, and the polyester resin was stirred at 260° C. for 5 minutes in an atmosphere of nitrogen at normal pressure. After that, the temperature was raised to 280° C. over 60 minutes with gradual decrease in pressure in the reaction system to 13.3 Pa (0.1 Torr), and polycondensation reaction was further conducted at 280° C. and 13.3 Pa. The pressure in the system was raised back to normal pressure with nitrogen, and the resin under slight pressure was discharged into cold water in a strand shape and rapidly cooled. The resin was then kept in the cold water for 20 seconds and cut into cylindrical polyester pellets with a length of about 3 mm and a diameter of about 2 mm.

The polyester pellets obtained by melt-polymerization were dried under reduced pressure (under the conditions of 80° C. and 13.3 Pa or less for 12 hours), and subsequently subjected to crystallization treatment (under the conditions of 130° C. and 13.3 Pa or less for 3 hours, and under the conditions of 160° C. and 13.3 Pa or less for further 3 hours). After cooling, the polyester pellets were subjected to solid-phase polymerization in a solid-phase polymerization reactor kept at pressure of 13.3 Pa or less and a temperature ranging from 200° C. to 220° C. to obtain polyester pellets with intrinsic viscosity (IV) of 1.05 dl/g, acid value (AV) of 110 eq/ton, and TOD of 0.025.

Example 11

In a 10 L pressure vessel equipped with a stirrer, a thermometer, and a condenser for distillation, 2593 g of terephthalic acid (manufactured by Mitsui Chemicals, Inc.), 1937 g of ethylene glycol (manufactured by NIPPON SHOKUBAI CO., LTD.), and 4 g of triethylamine (manufactured by NACALAI TESQUE, INC.) were charged, and subjected to esterification at 240° C. for 1.5 to 3.0 hours under pressure of 0.35 MPa. The compound represented by Formula (I) obtained in Synthesis Example 1 was continuously added to the polyester obtained through the esterification at a controlled flow velocity, so that the amount of the compound represented by Formula (I) became 0.2% by weight relative to 100% by weight of the alcohol component in the obtained polyester resin, and the reaction was proceeded stepwise.

Germanium dioxide and triethyl phosphate for a polycondensation catalyst were added so that the amount of germanium atom (Ge) was 100 ppm and the amount of phosphorus atom (P) was 100 ppm, respectively, to the mass of the polyester resin. Then, ‘Solvent Blue 45’ (manufactured by Clariant AG) was added so that the amount thereof was 1 ppm to the polyester resin, and the polyester resin was stirred at 260° C. for 5 minutes in an atmosphere of nitrogen at normal pressure. After that, the temperature was raised to 280° C. over 60 minutes with gradual decrease in pressure in the reaction system to 13.3 Pa (0.1 Torr), and polycondensation reaction was further conducted at 280° C. and 13.3 Pa. The pressure in the system was raised back to normal pressure with nitrogen, and the resin under slight pressure was discharged into cold water in a strand shape and rapidly cooled. The resin was then kept in the cold water for 20 seconds and cut into cylindrical polyester pellets with a length of about 3 mm and a diameter of about 2 mm.

The polyester pellets obtained by melt-polymerization were dried under reduced pressure (under the conditions of 80° C. and 13.3 Pa or less for 12 hours), and subsequently subjected to crystallization treatment (under the conditions of 130° C. and 13.3 Pa or less for 3 hours, and under the conditions of 160° C. and 13.3 Pa or less or further 3 hours). After cooling, the polyester pellets were subjected to solid-phase polymerization in a solid-phase polymerization reactor kept at a pressure of 13.3 Pa or less and a temperature ranging from 200° C. to 220° C. to obtain polyester pellets with intrinsic viscosity (IV) of 1.18 dl/g, acid value (AV) of 30 eq/ton, and TOD of 0.330.

Example 12

In a 10 L pressure vessel equipped with a stirrer, a thermometer, and a condenser for distillation, 2593 g of terephthalic acid (manufactured by Mitsui Chemicals, Inc.), 1937 g of ethylene glycol (manufactured by NIPPON SHOKUBAI CO., LTD.), and 4 g of triethylamine (manufactured by NACALAI TESQUE, INC.) were charged, and subjected to esterification at 240° C. for 1.5 to 3.0 hours under pressure of 0.35 MPa. The compound represented by Formula (I) obtained in Synthesis Example 1 was continuously added to the polyester obtained through the esterification at a controlled flow velocity, so that the amount of the compound represented by Formula (I) became 0.2% by weight relative to 100% by weight of the alcohol component in the obtained polyester resin, and the reaction was proceeded stepwise.

Tetrabutyl titanate and triethyl phosphate for a polycondensation catalyst were added so that the amount of titanium atom (Ti) was 10 ppm and the amount of phosphorus atom (P) was 100 ppm, respectively, to the mass of the polyester resin. Then, ‘Solvent Blue 45’ (manufactured by Clariant AG) was added so that the amount thereof was 2 ppm to the polyester resin, and the polyester resin was stirred at 260° C. for 5 minutes in an atmosphere of nitrogen at normal pressure. After that, the temperature was raised to 280° C. for over 60 minutes with gradual decrease in pressure in the reaction system to 13.3 Pa (0.1 Torr), and polycondensation reaction was further conducted at 280° C. and 13.3 Pa. The pressure in the system was raised back to normal pressure with nitrogen, and the resin under slight pressure was discharged into cold water in a strand shape and rapidly cooled. The resin was then kept in the cold water for 20 seconds and cut into cylindrical polyester pellets with a length of about 3 mm and a diameter of about 2 mm.

The polyester pellets obtained by melt-polymerization were dried under reduced pressure (under the conditions of 80° C. and 13.3 Pa or less for 12 hours), and subsequently subjected to crystallization treatment (under the conditions of 130° C. and 13.3 Pa or less for 3 hours, and under the conditions of 160° C. and 13.3 Pa or less for further 3 hours). After cooling, the polyester pellets were subjected to solid-phase polymerization in a solid-phase polymerization reactor kept at pressure of 13.3 Pa or less and a temperature ranging from 200° C. to 220° C. to obtain polyester pellets with intrinsic viscosity (IV) of 1.18 dl/g, acid value (AV) of 31 eq/ton, and TOD of 0.360.

Comparative Example 1

Comparative Example 1 was conducted under the same polymerization conditions as Example 1 except that the compound represented by Formula (I) was not added and that germanium dioxide and triethyl phosphate for a polycondensation catalyst were added so that the amount of germanium atom (Ge) was 100 ppm and the amount of phosphorus atom (P) was 30 ppm, respectively, to the mass of polyester resin, to obtain polyester pellets with intrinsic viscosity (IV) of 1.19 dl/g, acid value (AV) of 15 eq/ton, and TOD of 0.400.

Comparative Example 2

Comparative Example 2 was conducted under the same polymerization conditions as Example 1 except that the addition amount of the compound represented by Formula (I) obtained in Synthesis Example 1 was changed to 0.0001% by weight and that germanium dioxide and triethyl phosphate for a polycondensation catalyst were added so that the amount of germanium atom (Ge) was 100 ppm and the amount of phosphorus atom (P) was 30 ppm, respectively, to the mass of polyester resin, to obtain polyester pellets with intrinsic viscosity (IV) of 1.22 dl/g, acid value (AV) of 17 eq/ton, and TOD of 0.400.

Comparative Example 3

Comparative Example 3 was conducted under the same polymerization conditions as Example 1 except that the addition amount of the compound represented by Formula (I) obtained in Synthesis Example 1 was changed to 6% by weight and that germanium dioxide and triethyl phosphate for a polycondensation catalyst were added so that the amount of germanium atom (Ge) was 100 ppm and the amount of phosphorus atom (P) was 30 ppm, respectively, to the mass of polyester resin, to obtain polyester pellets with intrinsic viscosity (IV) of 0.71 dl/g, acid value (AV) of 16 eq/ton, and TOD of 0.400.

TABLE 2

| | Polyester resin | | | | | | | |
|---|---|---|---|---|---|---|---|---|
| | | | | Branching agent | | Melting | | |
| | IV dl/g | AV eq/ton | Catalyst | Type | % by weight | point ° C. | Gelation | TOD |
| Example 1 | 1.18 | 15 | Al/P | Synthesis Example 1 | 0.2 | 256 | Good | 0.015 |
| Example 2 | 1.17 | 20 | Al/P | Synthesis Example 1 | 0.001 | 257 | Good | 0.015 |
| Example 3 | 1.20 | 20 | Al/P | Synthesis Example 1 | 3.0 | 252 | Good | 0.010 |
| Example 4 | 1.20 | 18 | Al/P | Synthesis Example 2 | 0.2 | 255 | Good | 0.015 |
| Example 5 | 1.15 | 19 | Al/P | Synthesis Example 3 | 0.2 | 255 | Good | 0.015 |
| Example 6 | 1.14 | 17 | Al/P | Synthesis Example 4 | 0.2 | 255 | Good | 0.015 |
| Example 7 | 1.09 | 20 | Al/P | Synthesis Example 5 | 0.2 | 255 | Good | 0.015 |
| Example 8 | 1.08 | 19 | Al/P | Synthesis Example 6 | 0.2 | 253 | Good | 0.015 |
| Example 9 | 1.18 | 45 | Al/P | Synthesis Example 1 | 0.2 | 256 | Average to good | 0.020 |
| Example 10 | 1.05 | 110 | Al/P | Synthesis Example 1 | 0.2 | 256 | Average | 0.025 |
| Example 11 | 1.18 | 30 | Ge/P | Synthesis Example 1 | 0.2 | 256 | Good | 0.330 |
| Example 12 | 1.18 | 31 | Ti/P | Synthesis Example 1 | 0.2 | 256 | Good | 0.360 |
| Comparative Example 1 | 1.19 | 15 | Ge/P | — | 0 | 257 | Good | 0.400 |
| Comparative Example 2 | 1.22 | 17 | Ge/P | Synthesis Example 1 | 0.0001 | 255 | Good | 0.400 |
| Comparative Example 3 | 0.71 | 16 | Ge/P | Synthesis Example 1 | 6.0 | 249 | Bad | 0.400 |

| | Characteristics in melt viscosity | | Content of | Molded article of polyester resin | | | | |
|---|---|---|---|---|---|---|---|---|
| | Taking up speed m/min | Melt tension mN | cyclic oligomers (CT4) ppm | Moldability | Mechanical characteristics | Surface smoothness | Transparency | Transparency in continuous molding |
| Example 1 | 100 | 46.1 | 2370 | Good | Good | Good | Good | Good |
| Example 2 | 100 | 16.7 | 2580 | Good | Good | Good | Good | Good |
| Example 3 | 100 | 54.1 | 1800 | Very good | Good | Good | Good | Very good |
| Example 4 | 100 | 47.2 | 2370 | Good | Good | Good | Good | Good |
| Example 5 | 100 | 48.3 | 2370 | Good | Good | Good | Good | Good |
| Example 6 | 100 | 49.5 | 2370 | Good | Good | Good | Good | Good |
| Example 7 | 100 | 51.1 | 2380 | Very good | Good | Good | Good | Good |
| Example 8 | 100 | 45.2 | 2300 | Good | Good | Very good | Very good | Good |
| Example 9 | 100 | 45.5 | 2380 | Good | Good | Average to good | Average to good | Good |
| Example 10 | 100 | 45.6 | 2380 | Good | Good | Average | Average | Good |
| Example 11 | 100 | 45.5 | 2380 | Good | Good | Good | Good | Good |

TABLE 2-continued

| | | | | | | | | |
|---|---|---|---|---|---|---|---|---|
| Example 12 | 100 | 45.5 | 2390 | Good | Good | Good | Good | Good |
| Comparative Example 1 | 100 | 9.2 | 2700 | Bad | Good | Very good | Very good | Bad to average |
| Comparative Example 2 | 100 | 9.9 | 2680 | Bad to average | Good | Good | Good | Average |
| Comparative Example 3 | — | — | — | — | — | — | — | — |

Polyester resins of Examples 1 to 12 have the melt viscosity of 26000 dPa·s or more as measured under conditions of a temperature of 270° C. and a shear rate of 30 $s^{-1}$ and 6500 dPa·s or less as measured under conditions of a temperature of 270° C. and a shear rate of 2000 $s^{-1}$.

INDUSTRIAL APPLICABILITY

The polyester resin of the present invention enables improvement in moldability in extrusion molding, profile extrusion molding, direct blow molding, inflation molding, injection blow molding, and calendar processing molding, which require high melt tension, and also improvement in mechanical characteristics with maintained transparency. Such a polyester resin is expected to make a significant contribution to industry.

The invention claimed is:

1. A polyester resin comprising a constituent moiety derived from a dicarboxylic acid component and a constituent moiety derived from an alcohol component that comprises a compound represented by Formula (I), wherein a content of the compound represented by Formula (I) is 0.0002 to 5.9% by weight in 100% by weight of the alcohol component:

(I)

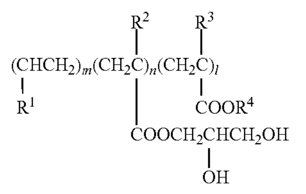

in the formula, m and n each represent 1 to 1000, 1 represents 0 to 1000, $R^1$ represents an aromatic hydrocarbon group having 6 to 20 carbon atoms, and $R^2$, $R^3$, and $R^4$ each represent a hydrogen atom or an alkyl group having 1 to 10 carbon atoms, and a content of cyclic tetramer in the polyester resin is less than 2680 ppm.

2. The polyester resin according to claim 1, wherein the compound represented by Formula (I) has weight average molecular weight of 200 or more and 500000 or less.

3. The polyester resin according to claim 1, wherein the dicarboxylic acid component comprises 85 to 100 mol % of terephthalic acid in 100 mol % of the dicarboxylic acid component and the alcohol component comprises ethylene glycol.

4. The polyester resin according to claim 1, wherein the polyester resin has melt tension of 15 mN or more as measured under conditions of a temperature of 270° C., a taking up speed of 100 m/min, and a shear rate of 243 $s^{-1}$.

5. The polyester resin according to claim 1, wherein the polyester resin has melt viscosity of 26000 dPa·s or more as measured under conditions of a temperature of 270° C. and a shear rate of 30 $s^{-1}$ and 6500 dPa·s or less as measured under conditions of a temperature of 270° C. and a shear rate of 2000 $s^{-1}$.

6. The polyester resin according to claim 2, wherein the dicarboxylic acid component comprises 85 to 100 mol % of terephthalic acid in 100 mol % of the dicarboxylic acid component and the alcohol component comprises ethylene glycol.

7. The polyester resin according to claim 2, wherein the polyester resin has melt tension of 15 mN or more as measured under conditions of a temperature of 270° C., a taking up speed of 100 m/min, and a shear rate of 243 $s^{-1}$.

8. The polyester resin according to claim 3, wherein the polyester resin has melt tension of 15 mN or more as measured under conditions of a temperature of 270° C., a taking up speed of 100 m/min, and a shear rate of 243 $s^{-1}$.

9. The polyester resin according to claim 6, wherein the polyester resin has melt tension of 15 mN or more as measured under conditions of a temperature of 270° C., a taking up speed of 100 m/min, and a shear rate of 243 $s^{-1}$.

10. The polyester resin according to claim 2, wherein the polyester resin has melt viscosity of 26000 dPa·s or more as measured under conditions of a temperature of 270° C. and a shear rate of 30 $s^{-1}$ and 6500 dPa·s or less as measured under conditions of a temperature of 270° C. and a shear rate of 2000 $s^{-1}$.

11. The polyester resin according to claim 3, wherein the polyester resin has melt viscosity of 26000 dPa·s or more as measured under conditions of a temperature of 270° C. and a shear rate of 30 $s^{-1}$ and 6500 dPa·s or less as measured under conditions of a temperature of 270° C. and a shear rate of 2000 $s^{-1}$.

12. The polyester resin according to claim 4, wherein the polyester resin has melt viscosity of 26000 dPa·s or more as measured under conditions of a temperature of 270° C. and a shear rate of 30 $s^{-1}$ and 6500 dPa·s or less as measured under conditions of a temperature of 270° C. and a shear rate of 2000 $s^{-1}$.

* * * * *